(No Model.)

W. L. MILLAR.
TAG AND DRIVER THEREFOR.

No. 547,274. Patented Oct. 1, 1895.

WITNESSES:
John A. Rennie
Fred Acker

INVENTOR
W. L. Millar
BY
Munn & Co
ATTORNEYS.

UNITED STATES PATENT OFFICE.

WILLIAM L. MILLAR, OF CHARLESTON, SOUTH CAROLINA.

TAG AND DRIVER THEREFOR.

SPECIFICATION forming part of Letters Patent No. 547,274, dated October 1, 1895.

Application filed May 23, 1895. Serial No. 550,433. (No model.)

*To all whom it may concern:*

Be it known that I, WILLIAM L. MILLAR, of Charleston, in the county of Charleston and State of South Carolina, have invented a new and useful Improvement in Tags and Drivers Therefor, of which the following is a full, clear, and exact description.

My invention relates to an improvement in tags adapted for use in connection with bales, bundles, or packages, and especially to an improvement in metallic tags and drivers for placing them in position in the bale or package, the object of the invention being to construct the tag in a simple, durable, and economic manner, and to provide therefor an efficient and expeditiously-applied locking device, and furthermore to so construct the driver that it will cause the tag to enter the package in a ready manner, and whereby the driver may be easily detached from the tag and removed from the bale.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 1:
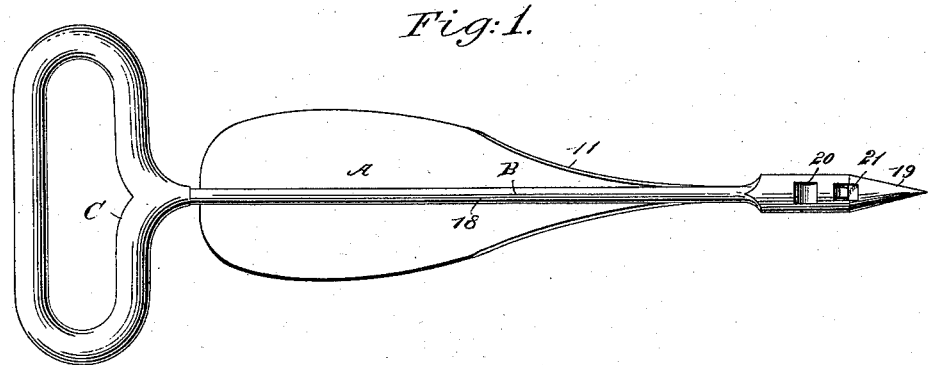
Figure 2:
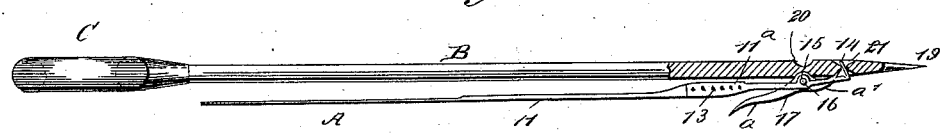
Figure 3:
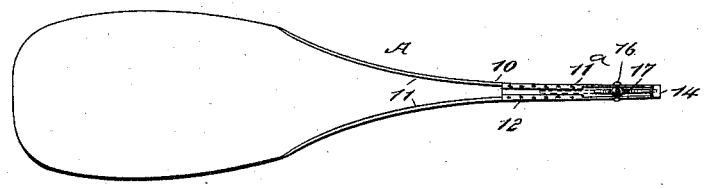
Figure 4:
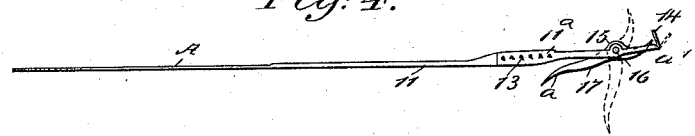
Figure 5:
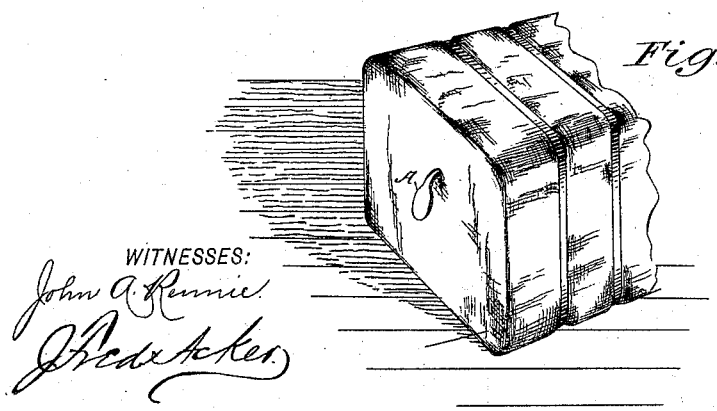

Figure 1 is a plan view of the driver and tag attached. Fig. 2 is a side elevation of the same, the driver being partially in section. Fig. 3 is a plan view of the tag. Fig. 4 is a side elevation thereof, and Fig. 5 illustrates the tag in position in a bale of cotton.

In carrying out the invention the tag A is preferably made of metal, and the body of the tag is provided with a shank 10 of any desired length, which shank is turned over on its edges, forming inwardly-extending flanges 11, strengthening the shank, since it is of necessity quite narrow. Near the rear portion of the shank the marginal flange 11 is made quite high, as shown at 11ª in the drawings, and is carried horizontally over the upper face of the shank, being provided in its upper edge with a roughened surface 12 and likewise with a more or less roughened side surface 13. The rear end of the shank is turned upward and forwardly to form a lip 14, and between the enlarged portion 11ª of the shank-flange and said lip ears 15 are constructed on the sides of the shank, in which a pivot-pin 16 is placed, and this pivot-pin is adapted to fulcrum an anchor 17. This anchor comprises a long member $a$ and a shorter member $a'$. The long member is given practically a compound curve, its extremity being decidedly downwardly curved, and this portion extends below the bottom portion of the shank, while the shorter member $a'$ is upwardly curved and is adapted to extend above the top of the shank; but in one position of the anchor its members will lie quite close to the shank, but are carried substantially at right angles thereto if they meet with resistance and the tag is drawn outward.

The driver B comprises a body 18, which is of greater length than the tag, and a handle C at one end of the body. The opposite end of the body of the driver is widened and is usually rounded off at top and bottom, terminating in a decided point 19. In the top and in the bottom of the wide portion of the body of the driver a concaved recess 20 is produced, the recesses being one over the other, and between the point and these recesses an opening 21 is made in the said widened portion of the body, which extends through from side to side, and this opening has its walls beveled in opposite directions from the center, both at top and bottom of the body, as is best shown in Fig. 2.

In operation the lip of the tag is made to enter the opening 21 in the body of the driver, the ears 15 on the shank of the tag entering a recess 20 in the driver. The tag is then held parallel with the driver, the anchor assuming substantially a horizontal position, as shown in Fig. 2. The driver is then forced into the bale, carrying the shank of the tag with it. When the shank has been entered a sufficient distance, the driver is withdrawn from the tag by simply moving its inner end upward to disengage it from the lip 14 of the tag, whereupon the driver may be withdrawn from the bale. By drawing outward on the tag, after the removal of the driver, the anchor will be carried to the substantially vertical position shown in dotted lines, Fig. 4, forming a barrier which will effectually prevent the tag from being withdrawn from the bale. At the same time the roughened surfaces 12 and 13 of the tag will cling to the material in the bale, affording an extra hold. The body of the tag may then be bent downward, as shown in Fig. 5, so as to be out of the way.

It will be understood that the main feature of my invention is providing for the tagging of cotton in such manner that it can be distinguished or picked out from any cargo when there are numerous shippers, as heretofore there has been some difficulty in locating any one shipper's grades, in consequence of the marks having been defaced or destroyed in compressing, and especially is this the case in fire cargoes when the marks are either entirely removed or partially obliterated by water or fire.

Having thus described my invention, I claim as new and desire to secure by Letters Patent—

1. A tag formed with an integral shank having its edges turned over forming inwardly extending flanges, the said marginal flanges near the rear portion of the shank being provided with a roughened surface, a lip formed at the extremity of the shank, and an anchor pivoted in the shank between the said roughened portion and the lip, as and for the purpose set forth.

2. A tag having an anchor pivoted in its shank and extending above and below it, the end of the shank extending beyond the pivot and having a lip formed thereon, the upper member of the anchor being of less length than the portion of the shank extending beyond the pivot, substantially as shown and described.

3. A tag for the purpose described, having an anchor pivoted in its shank, extending above and below it, the upper member of the anchor being shorter than the lower member and the two members being oppositely curved, and a lip formed at the extremity of the shank, as and for the purpose specified.

4. A driver for tags, the same comprising a body having a handle attached, the body being provided with a recess, and an opening adjacent to the recess having opposing walls of its entrance inclined in opposite directions, as and for the purpose specified.

5. A driver for tags, the same comprising a body having a handle at one end and pointed at the opposite end, the body being provided with a recess and an opening between the recess and the point of the driver, as and for the purpose specified.

6. The combination with the driver, the body of which is provided with a recess and an opening adjacent to the recess, of a tag having a shank provided with ears between which an anchor is pivoted, and a lip formed on the said shank, the said ears being adapted to enter the recess of the driver and the said lip being adapted to enter the opening in the driver, as and for the purpose specified.

7. The combination, with the driver the body of which is provided with a cavity and an opening, opposing walls of which are inclined in opposite directions from a point near the center, the body being pointed adjacent to the said opening, of a tag the shank of which is provided with a pivoted anchor extending above and below it, the pivot of the anchor being adapted to enter the recess of the driver, and a lip located at the extremity of the said shank, being adapted to enter the opening in the said driver, as and for the purpose specified.

WILLIAM L. MILLAR.

Witnesses:
JUSTIN P. O'NEILL,
GEO. G. BUTLER.